United States Patent
Lin et al.

(10) Patent No.: US 10,961,386 B2
(45) Date of Patent: Mar. 30, 2021

(54) POLYESTER RESIN COMPOSITION AND METHOD FOR MANUFACTURING A HIGH-DENSITY TABLEWARE ARTICLE

(71) Applicant: NAN YA PLASTICS CORPORATION, Taipei (TW)

(72) Inventors: Fong-Chin Lin, Taipei (TW); Tzong-Yang Su, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 112 days.

(21) Appl. No.: 16/351,627

(22) Filed: Mar. 13, 2019

(65) Prior Publication Data

US 2020/0131360 A1    Apr. 30, 2020

(30) Foreign Application Priority Data

Oct. 29, 2018    (TW) .................. 107138178

(51) Int. Cl.
| | | |
|---|---|---|
| *C08L 67/02* | (2006.01) | |
| *C08J 3/12* | (2006.01) | |
| *C08K 3/30* | (2006.01) | |
| *C08K 3/34* | (2006.01) | |

(52) U.S. Cl.
CPC .................. *C08L 67/02* (2013.01); *C08J 3/12* (2013.01); *C08K 3/30* (2013.01); *C08K 3/34* (2013.01); *C08K 2003/3045* (2013.01)

(58) Field of Classification Search
CPC ... C08L 67/02; C08K 3/30; C08K 2003/3045; C08K 3/34; C08J 3/12
USPC ....................................................... 524/423
See application file for complete search history.

(56) References Cited

U.S. PATENT DOCUMENTS

| | | | |
|---|---|---|---|
| 5,149,734 A | * | 9/1992 Fisher ................... C08K 3/30 |
| | | | 524/423 |
| 2018/0179376 A1 | | 6/2018 Liu et al. | |

FOREIGN PATENT DOCUMENTS

| | | | |
|---|---|---|---|
| CN | 105273370 A | * | 1/2016 |
| CN | 105273370 A | | 1/2016 |
| EP | 0423509 A1 | | 4/1991 |
| JP | 8183114 A | | 7/1996 |
| JP | 2001-200148 | * | 7/2001 |
| JP | 2001200148 A | | 7/2001 |
| JP | 2004300432 A | | 10/2004 |
| JP | 200934871 A | | 2/2009 |

OTHER PUBLICATIONS

Translation of CN 105273370, Jan. 27, 2016. (Year: 2016).*
Translation of JP 2001-200148 (application No. 2000-315667), Jul. 24, 2001. (Year: 2001).*

* cited by examiner

*Primary Examiner* — Hui H Chin
(74) *Attorney, Agent, or Firm* — Li & Cai Intellectual Property (USA) Office

(57) ABSTRACT

A method for manufacturing a high-density tableware article includes the following steps. The first step is providing a polyester resin composition including 45 to 78% by weight of a blend resin and 20 to 50% by weight of an inorganic filler. The blend resin includes PET resin and PBT resin and the content ratio of PET resin to PBT resin in the blended resin by weight is from 1:0.86 to 1:4.8. The next step is granulating the polyester resin composition to produce plastic granules. The final step is molding the plastic granules into a tableware article.

9 Claims, 3 Drawing Sheets

POLYESTER RESIN COMPOSITION AND METHOD FOR MANUFACTURING A HIGH-DENSITY TABLEWARE ARTICLE

CROSS-REFERENCE TO RELATED PATENT APPLICATION

This application claims the benefit of priority to Taiwan Patent Application No. 107138178, filed on Oct. 29, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for manufacturing a tableware article, and more particularly to a polyester resin composition and high density polyester tableware using the same.

BACKGROUND OF THE DISCLOSURE

Ceramic tableware are popular among people owing to their variety of shapes, bright colors, cool and smooth tactile sensation and easy washing. However, ceramic tableware are easily broken upon impact or when dropped. In addition, ceramic tableware require a production process with more complicated techniques and high energy consumption. Nowadays, the use of ceramic-like tableware has become more and more popular.

Melamine is commonly used in ceramic-like tableware. Melamine tableware is cheap and shatterproof so that many stores prefer its use for serving food. However, melamine tableware may release melamine at around 30° C. to 40° C., and thus, for people who regularly eat out, eating with melamine tableware is comparable to taking medicine of chronic diseases The long-term accumulation of melamine may seriously damage the kidneys.

Polybutylene terephthalate (PET) is a safe food grade plastic with high-temperature resistance and is able to be recycled and reused. PET is commonly used in the manufacture of tableware. However, PET products not only have a poor surface gloss inferior to ceramic products but are also difficult to print patterns or textures thereon, or otherwise the printed patterns or textures may be defective.

Therefore, a novel method is required to improve the aesthetics of PET tableware and increase the market acceptance of PET tableware.

SUMMARY OF THE DISCLOSURE

In response to the above-referenced technical inadequacies, the present disclosure provides a method for manufacturing a high density polyester tableware article having a thermal-transfer printed pattern. Tableware manufactured by the method take aesthetics and food safety into consideration and can replace melamine tableware commonly used by the public.

In one aspect, the present disclosure provides a method for manufacturing a high-density tableware article, including: providing a polyester resin composition including 45 to 78% by weight of a blend resin and 20 to 50% by weight of an inorganic filler, wherein the blend resin includes PET resin and PBT resin, and the content ratio of PET resin to PBT resin in the blended resin by weight is from 1:0.86 to 1:4.8; granulating the polyester resin composition to obtain a plurality of plastic granules; and molding the plastic granules into a tableware article In certain embodiments, the inorganic filler is one of barium sulfate, talc, calcium silicate or any combination thereof.

In certain embodiments, the inorganic filler includes barium sulfate and calcium silicate and the content ratio of the barium sulfate to the calcium silicate by weight is from 1:0.28 to 1:1.67.

In certain embodiments, in the step of granulating the polyester resin composition, the polyester resin composition is added to a twin-screw extruder and melted at a temperature between 250° C. and 280° C. for granulation.

In certain embodiments, the method further includes a step of post-crystallizing the tableware article after the step of molding the plastic granules into the tableware article.

In certain embodiments, the step of post-crystallizing the tableware article includes heat-treating the tableware article at a temperature between 150° C. and 200° C.

In certain embodiments, the tableware article is heat-treated for a period of time between 10 minutes and 30 minutes.

In certain embodiments, the step of post-crystallizing the tableware article includes irradiating the tableware article with infrared rays.

In certain embodiments, the tableware article is irradiated by the infrared rays for a period of time between 10 minutes and 20 minutes.

In certain embodiments, the polyester resin composition further includes 1 to 10% by weight of at least one additive selected from one or a combination of two of a lubricant, an antioxidant, a stabilizer, and a coloring agent.

In one aspect, the present disclosure provides a polyester resin composition for manufacturing a high-density tableware article. The polyester resin composition includes 45 to 78% by weight of a blend resin and 20 to 50% by weight of an inorganic filler. The blend resin includes PET resin and PBT resin, and the content ratio of PET resin to PBT resin in the blended resin by weight is from 1:0.86 to 1:4.8.

In certain embodiments, the inorganic filler is one of barium sulfate, talc, calcium silicate or any combination thereof.

In certain embodiments, the inorganic filler includes barium sulfate and calcium silicate and the content ratio of barium sulfate to calcium citrate by weight is from 1:0.28 to 1:1.67.

One of the advantages of the present disclosure is that the method provided by the present disclosure can provide a ceramic-like glossy appearance to the tableware article and improve the drop resistance of the tableware article by including the steps of: granulating a polyester resin composition including specific amounts of PET resin, PBT resin and an inorganic filler to obtain plastic granules, and molding the plastic granules into a tableware article.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
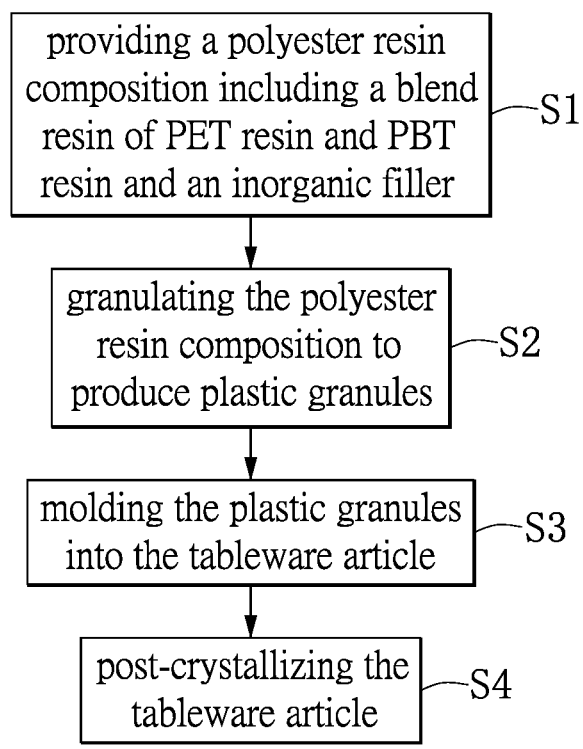
FIG. 1 is a flowchart of a method for manufacturing a high-density tableware article of the present disclosure.

Melamine tableware (i.e., tableware made of melamine-formaldehyde resin) may cause excessive migration of melamine and formaldehyde to foods, which may do harm to human health. PET (polyethylene terephthalate) is a non-toxic plastic, and PET containers are widely used in packaging for water and beverages. PBT (polybutylene terephthalate) has a fast crystallization rate which facilitates the rapid molding of the product, furthermore, PBT has excellent heat resistance, chemical resistance and mechanical strength, and these properties are stable over a wide range of environmental conditions. Therefore, the present disclosure provides a method for the manufacture of tableware that uses a polyester resin composition. Tableware obtained thereby such as a bowl, dish, spoon or chopsticks has both a ceramic-like glossy appearance and excellent drop resistance, and will not easily break in use.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, the present disclosure provides a method for manufacturing a high-density tableware article, including: step S1, providing a polyester resin composition including a blend resin of PET resin and PBT resin and an inorganic filler; step S2, granulating the polyester resin composition to obtain plastic granules; step S3, molding the plastic granules into the tableware article; and step S4, post-crystallizing the tableware article.

In the step S1, the polyester resin composition mainly includes 45% to 78% by weight of a blend resin of PET resin and PBT resin and 20% to 50% by weight of an organic filler, and a content ratio of PET resin and PBT resin by weight is from 1:0.86 to 1:4.8. PET resin mainly contributes to improving the molding effect of the product and increasing the toughness of the product; PBT resin mainly contributes to the mechanical strength and heat resistance of the product; and the organic filler is mainly used to increase the surface gloss of the product of the polyester resin composition. Furthermore, the organic filler also helps to improve the mechanical properties of the product, for example, increase the tensile strength, shear strength, impact resistance and hardness of the product.

The inorganic filler is one of a barium sulfate, talc, calcium silicate or any combination thereof. Preferably, the inorganic filler includes barium sulfate and calcium silicate, and the content ratio of the barium sulfate and the calcium silicate by weight is from 1:0.28 to 1:1.67. It should be noted that, if the content of the inorganic filler is less than 20% by weight, the product cannot be provided with desired physical properties. If the content of the inorganic filler is more than 50% by weight, the phenomenon of agglomeration of the inorganic filler may occur. Thus, the inorganic fillers are difficult to be uniformly dispersed in the blend resin of PET resin and PBT resin, which will in turn reduce the mechanical properties of the product.

The ingredients of the polyester resin composition can be uniformly mixed by a conventional mixing device. Without affecting the expected effects of the present disclosure, the polyester resin composition may optionally include at least one additive of a lubricant, an antioxidant, a stabilizer, and a coloring agent, but is not limited thereto. The content of the additive(s) can be from 1% to 10% by weight. Specific examples of the lubricant include EBS (ethylene bis stearamide), erucamide, polyethylene wax, paraffin wax, stearic acid, zinc stearate, and calcium stearate. Specific examples of the antioxidant include hindered phenol-based antioxidants, hindered amine-based antioxidants, phosphite-based antioxidants, and thioether-based antioxidants. Specific examples of the stabilizer can be a heat stabilizer and a light stabilizer. The coloring agent can be any suitable colorant (e.g., titanium dioxide).

The hindered phenol-based antioxidant may be n-octadecyl-3-(3',5'-di-tert-butyl-4'-hydroxyphenyl)propionate, n-octadecyl-3-(3'-Methyl-5'-tert-butyl-4'-hydroxyphenyl) propionate, n-tetradecyl-3-(3',5'-di-tert-butyl-4'-hydroxyphenyl)propionate, 1,6-hexanediol-bis[3-(3,5-di-tert-butyl-4-hydroxyphenyl)propionate], 1,4-butanediol-bis[3-(3,5-di-tert-butyl-4-hydroxyphenyl)propionate], 2,2'-methylene-bis(4-methyl-tert-Butylphenol), triethylene glycol-bis[3-(3-tert-butyl-5-methyl-4-hydroxyphenyl)propionate], tetra-[methylene-3-(3',5'-di-tert-butyl-4-hydroxyphenyl)propionate] methane, 3,9-bis[2-{3-(3-tert-butyl-4-hydroxy-5-methylphenyl) propionyloxy}-1,1-dimethylethyl]2,4,8,10-tetraoxaspiro(5,5)undecane, and etc.

The hindered amine-based antioxidant may be N,N'-bis-3-(3',5'-di-tert-butyl-4'-hydroxyphenyl)propenyl hexamethylenediamine, N,N'-tetramethylene-bis[3-(3'-methyl-5'-tert-butyl-4'-hydroxyphenyl)propanyl]diamine, N,N'-bis[3-(3,5-di-t-butyl-4-hydroxyphenyl)-propenyl] hydrazine, N-salicylidene-N'-salicylidene hydrazine, 3-(N-salicylidene) Amino-1,2,4-triazole, N,N'-bis[2-{3-(3,5-di-tert-butyl-4-hydroxyphenyl) propionyloxy}ethyl]poxyamide. The hindered amine-based antioxidant is preferably triethyleneglycol-bis [3-(3-tert-butyl-5-methyl-4-hydroxyphenyl)propionate] or hydrazine [methylene-3-(3',5'-di-tert-butyl-4-hydroxyphenyl)propionate] methane.

The phosphite-based antioxidant is preferably one in which at least one PO bond is bonded to the aromatic group, and examples thereof include tri(2,6-di-tert-butylphenyl) phosphite, tetra(2,6-di-tert-butylphenyl)4,4'-diphenyl phosphite, bis(2,6-di-tert-butyl-4-methylphenyl)pentaerythritoldiphosphite, 2, 2-methylenebis(4,6-di-t-butylphenyl)octylphosphite, 4,4'-butylene-bis(3-methyl-6-tert-butylphenyl-di-tridecyl)phosphite, 1,1,3-tri(2-methyl-4-di-tridecyl)phosphite-5-tert-butylphenyl)butane, tri(mixed mono- and di-nonylphenyl) phosphite, tri(hexamethylenephenyl)phosphite, 4,4'-isopropylidene bis(phenyl-dialkyl phosphite), and etc.

In the step S2, the polyester resin composition can be melted and kneaded in a twin screw extruder, with the process temperature set between 250° C. and 280° C., and the screw speed being set between 250 rpm and 290 rpm. After that, an extruded strip from the discharge port of the twin-screw extruder is cooled and subsequently shredded into plastic granules. The plastic granules may have an average size from 2 mm to 4 mm, but is not limited thereto.

In other embodiments, before conducting the step S2, the polyester resin composition can be melted and kneaded by a kneading device. The kneading device can be a general mixing tank, a kneading tank, a single-shaft or multi-shaft kneading device (e.g., kneading machine), but is not limited thereto. The kneading time can vary from 1 minute to 2 hours depending on the device used to process the polyester resin composition and its operating conditions (e.g., temperature).

Figure 2:
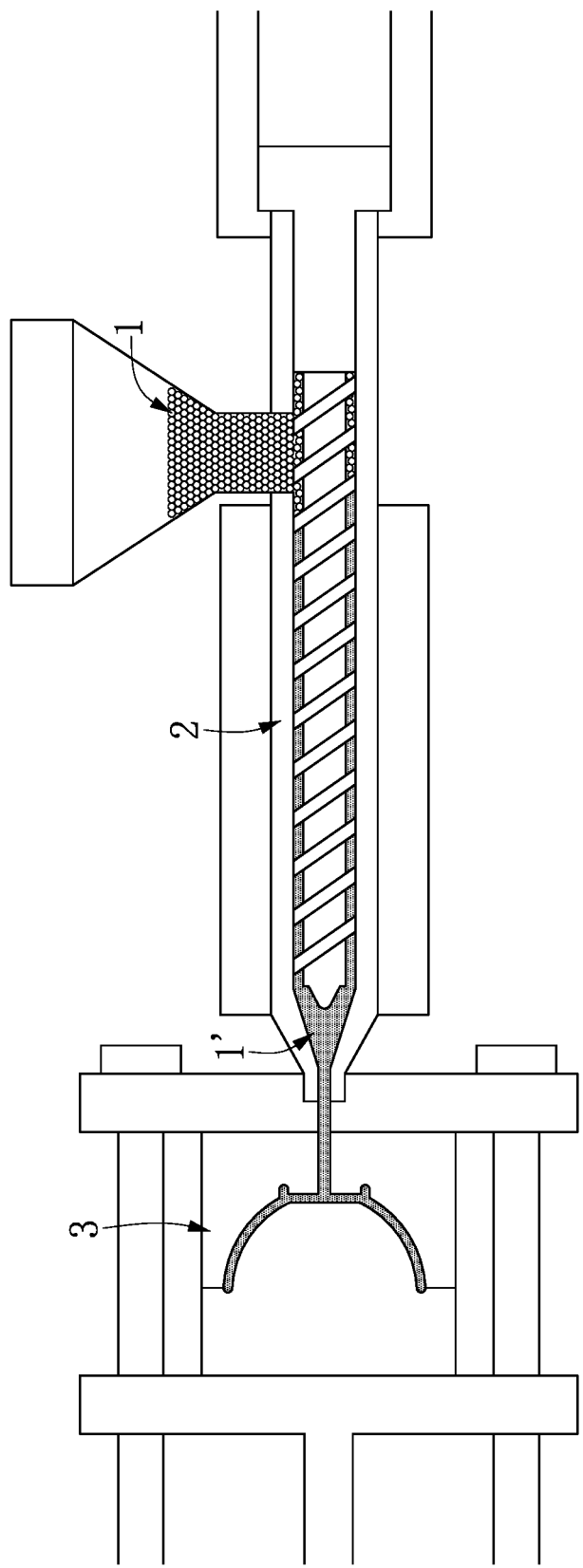
FIG. 2 is a schematic view showing a step of molding plastic granules into the tableware article of the method of the present disclosure.

In the step S3, as shown in FIG. 2, the plastic granules 1 can be added into a hot runner 2 to be melted into a molten plastic material 1'. Next, the molten plastic material 1' is filled in a shaping mold 3 and is then cured to form a tableware article 4 after cooling. In the present embodiment, the plastic granules 1 can be melted at a temperature between 250° C. and 280° C. The molding temperature can be between 90° C. and 120° C., and the molding time can be between 20 seconds and 60 seconds.

In the step S4, the post-crystallization of the tableware article 4 can be implemented by heat treatment at a temperature between 150° C. and 200° C. for a period of time between 10 minutes and 30 minutes. The post-crystallization of the tableware article can also be implemented by irradiating infrared rays to the tableware article 4 for a period of time between 10 minutes and 20 minutes. It should be noted that, in the process of post-crystallization, the secondary crystallization of crystalline polymers in the tableware article 4 can be accelerated, so as to orient molecular chains to the crystal direction and increase the crystallinity. Therefore, the crystal structure of the tableware article 4 is more complete, so that the temperature resistance and mechanical properties of the tableware article 4 can be improved, the internal stress of the tableware article 4 can be eliminated, and the mechanical properties of the tableware article 4 can be reduced.

Figure 3:
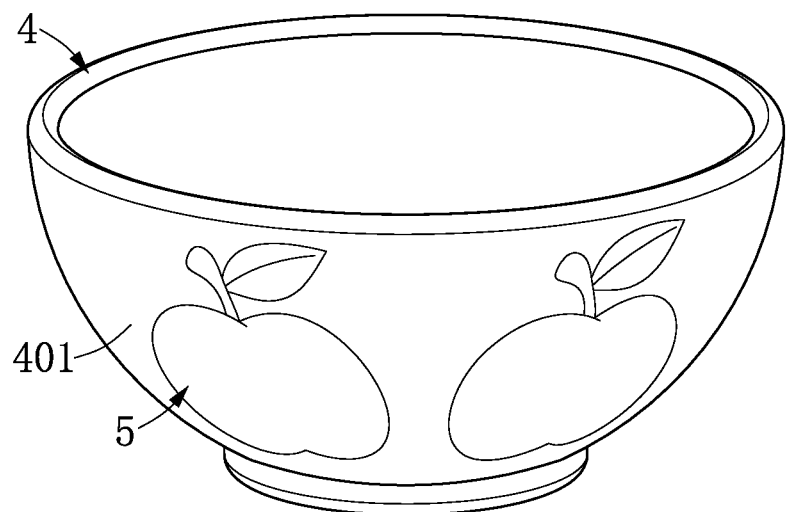
FIG. 3 is a schematic view showing the tableware article manufactured by the method of the present disclosure.
Figure 4:
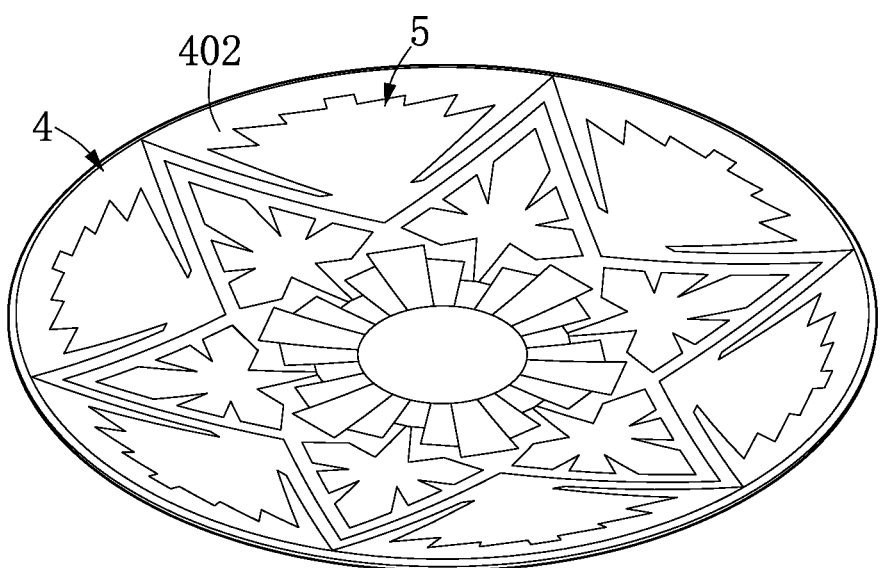
FIG. 4 is another schematic view showing the tableware article manufactured by the method of the present disclosure.

After completion of the step S4, the tableware article 4 can be subjected to a vacuum environment with a pressure between 150 torr and 760 torr and a temperature between 150° C. and 200° C. In the present embodiment, the heat treatment temperature for post-crystallizing the tableware article 4 is higher than or equal to a temperature for forming the thermal transfer printed pattern. As shown in FIG. 3, the tableware article 4 can be a bowl that has a thermal transfer printed pattern 5 on an external surface 401 thereof. As shown in FIG. 4, the tableware article 4 can be a dish that has a thermal transfer printed pattern 5 on an internal surface 402 thereof. However, the above-mentioned examples disclosed herein are not intended to limit the present disclosure. It should be noted that, the post-crystallized tableware article 4 can withstand relatively high temperatures, and both the interior and the exterior surfaces 401, 402 thereof are quite smooth. Therefore, a high-quality thermal transfer printed pattern 5, which is complete and clear, can be formed on the post-crystallized tableware article 4.

Examples 1-7 using different polyester resin compositions are shown in Table 1, wherein Examples 1-3 use different compositions. The evaluation results of mechanical properties of the tableware products according to Examples 1-7 are shown in Table 2. It can be observed from Table 1 and Table 2 that the surface gloss and mechanical properties of the tableware can be improved by blending the PET resin and the PBT resin in a specific amount and adding barium sulfate and calcium citrate having a specific composition.

TABLE 1

| Ingredients (wt%) | Example 1 | Example 2 | Example 3 | Example 4 | Example 5 | Example 6 | Example 7 |
| --- | --- | --- | --- | --- | --- | --- | --- |
| PET resin | 15 | 14.45 | 14.45 | 14.45 | 14.45 | 15 | 41.75 |
| PBT resin | 30.8 | 36.2 | 36.2 | 36.2 | 43.2 | 40.35 | 36.1 |
| Calcium silicate | 12 | 25 | 15 | 10 | 20 | 12 | 12.5 |
| Barium sulfate | 38 | 20 | 30 | 35 | 20 | 28 | 7.5 |
| Lubricant | 0.2 | 0.35 | 0.35 | 0.35 | 0.35 | 0.15 | 0.15 |
| White color masterbatch | 2 | 2 | 2 | 2 |  | 2 | 2 |
| Impact modifier | 2 | 2 | 2 | 2 | 2 | 2 |  |

TABLE 2

| Test item | Example 1 | Example 2 | Example 3 | Example 4 | Example 5 | Example 6 | Example 7 |
|---|---|---|---|---|---|---|---|
| Impact strength (Kg-cm/cm) | 3.4 | 5.45 | 4.32 | 4.17 | 4.63 | 4.69 | 3.5 |
| Tensile strength (Kg/cm2) | 395 | 507 | 416 | 402 | 464 | 424 | 612 |
| Elongation (%) | 1.6 | 2.5 | 2.3 | 2.2 | 2.8 | 2.3 | 4.5 |
| Hardness | 107.9 | 109.3 | 105.9 | 105.6 | 110.9 | 108.0 | 103.2 |
| Surface gloss | ⊚ | ◯ | ◯ | ◯ | ◯ | ◯ | ◯ |
| Scratch resistance | ◯ | ◯ | ◯ | ◯ | ◯ | ◯ | ◯ |
| Drop resistance | ◯ | ◯ | ◯ | ◯ | ◯ | ◯ | ◯ |

"⊚" indicates very high surface gloss
"◯" indicates high surface gloss/no scratches/no cracks One of the advantages of the present disclosure is that the method of the present disclosure, which granulates a polyester resin composition including specific amounts of PET resin, PBT resin and an inorganic filler to produce plastic granules and mold the plastic granules into a tableware article, can provide a ceramic-like glossy appearance to the tableware article and improve the drop resistance of the tableware article.

Furthermore, the high-density tableware article (e.g., bowl, dish, spoon or chopsticks) manufactured by the method of the present disclosure take aesthetics and food safety into consideration. The high-density tableware article does not release toxic substances during use, and can replace melamine tableware commonly used by the public.

The method of the present disclosure can further include a step of post-crystallizing the tableware article to increase the high-temperature resistance and surface gloss. Therefore, a high-quality thermal transfer printed pattern, which is complete and clear, can be formed on the post-crystallized tableware article.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing a tableware article, comprising:
    providing a polyester resin composition including 45 to 78% by weight of a blend resin and 20 to 50% by weight of at least one inorganic filler, wherein the blend resin includes PET resin and PBT resin that are present in a content ratio by weight from 1:0.86 to 1:4.8, the at least one inorganic filler includes barium sulfate and calcium silicate, and the content ratio of the barium sulfate to the calcium silicate by weight is from 1:0.28 to 1:1.67;
    granulating the polyester resin composition to produce plastic granules; and
    molding the plastic granules into a tableware article.

2. The method according to claim 1, wherein in the step of granulating the polyester resin composition, the polyester resin composition is added to a twin-screw extruder and melted at a temperature between 250° C. and 280° C. for granulation.

3. The method according to claim 1, further comprising: post-crystallizing the tableware article after the step of molding the plastic granules into the tableware article.

4. The method according to claim 3, wherein the step of post-crystallizing the tableware article includes heat-treating the tableware article being subjected to heat treatment at a temperature between 150° C. and 200° C.

5. The method according to claim 4, wherein the tableware article is subjected to heat treatment for a period of time between 10 minutes and 30 minutes.

6. The method according to claim 3, wherein the step of post-crystallizing the tableware article includes irradiating the tableware article with infrared rays.

7. The method according to claim 6, wherein the tableware article is irradiated by the infrared rays for a period of time between 10 minutes and 20 minutes.

8. The method according to claim 1, wherein the polyester resin composition further includes 1 to 10% by weight of at least one additive selected from one or a combination of two of a lubricant, a stabilizer, and a coloring agent.

9. A polyester resin composition for manufacturing a tableware article, comprising:
    45 to 78% by weight of a blend resin, wherein the blend resin includes PET resin and PBT resin and the content ratio of PET resin to PBT resin in the blended resin by weight is from 1:0.86 to 1:4.8; and
    20 to 50% by weight of at least one inorganic filler;
    wherein the at least one inorganic filler includes barium sulfate and calcium silicate, and the content ratio of barium sulfate to calcium citrate by weight is from 1:0.28 to 1:1.67.

\* \* \* \* \*